United States Patent [19]

Amberntsson et al.

[11] 4,005,440

[45] Jan. 25, 1977

[54] PRINTING HEAD FOR INK JET PRINTER

[75] Inventors: Jan Roger Amberntsson; Rober Ingemar Andersson, both of Angered; Stig Bertil Sultan, Floda, all of Sweden

[73] Assignee: Facit Aktiebolag, Atvidaberg, Sweden

[22] Filed: Mar. 10, 1975

[21] Appl. No.: 557,228

[30] Foreign Application Priority Data

Mar. 12, 1974 Sweden ............................ 7403312
Oct. 1, 1974 Sweden ............................ 7412233

[52] U.S. Cl. .......................................... 346/140 A
[51] Int. Cl.[2] ....................................... G01D 15/18
[58] Field of Search ............ 346/75, 140; 137/833; 235/201 PF

[56] References Cited

UNITED STATES PATENTS 3,306,538 2/1967 McCracken ................ 235/201 PF
3,645,448 2/1972 Houser .......................... 346/75 X

FOREIGN PATENTS OR APPLICATIONS 364,385 2/1974 Sweden ............................ 346/140

*Primary Examiner*—Joseph W. Hartary
*Attorney, Agent, or Firm*—Alfred E. Miller

[57] ABSTRACT

A printing head for an ink jet printer in which a multiplicity of channels are formed, preferably in one plate of the head. Each of the channels communicates with a capillary tube that opens into a boundary surface of the plate. The arrangement of the channels is such that the head can be of a smaller size than other constructions, and the openings of the capillary tubes can be located closer to one another.

5 Claims, 15 Drawing Figures

PRINTING HEAD FOR INK JET PRINTER

BACKGROUND OF THE INVENTION

Printing heads for ink jet printers, which are known, operate in such a manner that liquid from at least one pump chamber is conducted through a corresponding number of outlet channels to a capillary tube located at the end of the respective channel. In these constructions one wall of the pump chamber is in the form of a diaphragm which is acted upon by means of a piezoelectric crystal in order to generate the necessary pumping action. Consequently, when voltage is applied to the piezoelectric crystal the diaphragm curves inwardly and the increased pressure in the pump chamber is projected through the respective channel to the capillary tube. This pressure causes a liquid drop to be ejected from the capillary tube at a great velocity, and on to a recording medium, for example, a sheet of paper.

It will be apparent that the shape and location of the capillary tubes are of great importance for the reliable operation of the ink jet printer. The capillary tubes used in this type of apparatus generally has a diameter in the order of 0.1 mm. Therefore, in order to print a written line which is easily legible, the capillary tubes must be arranged in close proximity to each other and in precisely defined places. In this regard, one should be aware of the fact that only a slight displacement of one capillary tube relative to the others will cause distortion of the printed line and make reading very difficult if not impossible.

It is evident that great accuracy in the manufacturing of ink jet printers is of utmost necessity. Up until the present time these capillary tubes have been produced by either etching, stamping or milling grooves in one flat plate which is then combined with another plate to cover the resulting grooves to thereby form capillary tubes.

Another known method of manufacture of printing heads for ink jet printers is to drill the tubes from an outer surface of the head inwardly to the respective channels. It should be apparent that in this method as well as in the other known methods of this type the requirement for accuracy is extremely high which causes the methods employed to be time consuming, expensive, and not suitable for mass production. In addition, by using this known method there is always a discontinuity in the location where the capillary tube passes into the channel, and this affects the function of the print head in an unfavorable manner, particularly after an ink drop has been delivered with the resulting retraction of the ink.

SUMMARY OF THE INVENTION

It is an object of the present invention to overcome the disadvantages of the known apparatus and method relating to a printing head for an ink jet printer in which the shape of each of the capillary tubes is such that it tapers in the direction from the channel toward the opening of the tube on a main surface of the plate constituting part of the printing head.

It is a further object of the present invention to provide capillary tubes that taper in the direction from the channel toward the opening in the tube which terminates in a side of the plate.

It is another object of the present invention to provide a printing head for an ink jet printer that can be condensed in size and yet function effectively.

It is a further object of the present invention to provide a printing head for an ink jet printer in which the openings of the capillary tubes can be situated closer to one another as a result of the present construction and arrangement.

A desirable manufacturing method in accordance with the teachings of the present invention is achieved by fabricating a plate for the printing head with channels and capillary tubes by means of casting, injection molding, or forming in a mold having a base plate and spaced therefrom another plate provided with holes. In this arrangement, cores corresponding to the desired channels are inserted in the holes so as to project into the space between the two plates in correspondence with the desired channels and capillary tubes, after which a liquid mixture is supplied to said spaces and after hardening forms the plate having channels and capillary tubes. The hardened plate is then removed from the mold.

The invention will now be more fully described with reference to the accompanying drawings, in which.

Figure 10A:
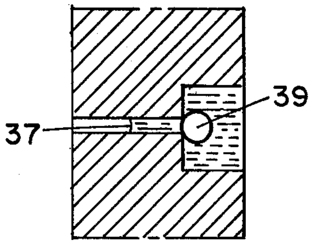
PRIOR ART FIG. 10a

FIG. 10*a* is a cross-sectional view taken through a known capillary tube and its connection to the respective channel.

Figure 10B:
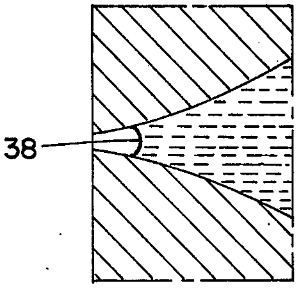

FIG. 10*b* is a cross-sectional view taken through a capillary tube constructed in accordance with the teachings of the present invention.

Figure 11:
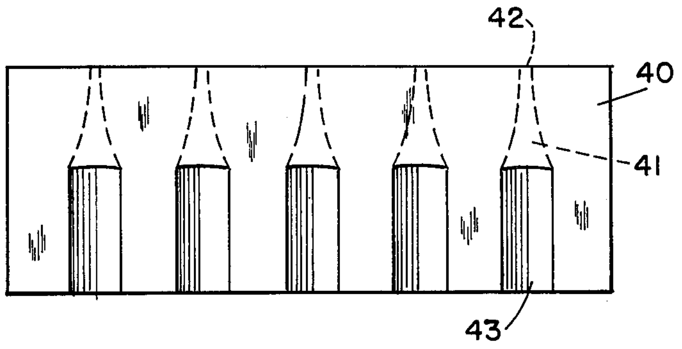

FIG. 11 is a side elevational view of a further embodiment of the invention showing the plate having capillary tubes.

Figure 12:
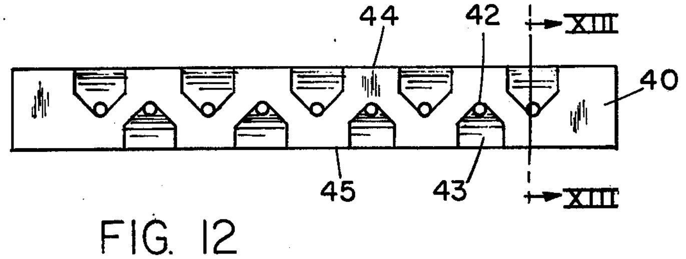

FIG. 12 is a bottom plan view of the plate shown in FIG. 11.

Figure 13:
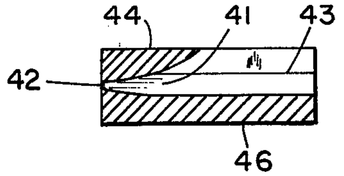

FIG. 13 is a sectional view taken on the lines III—III of FIG. 12 and

Figure 14:
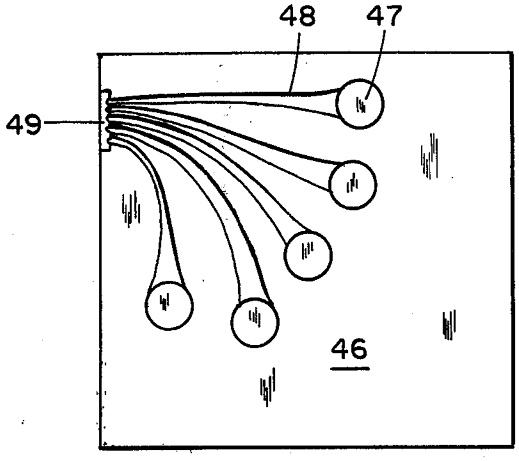

FIG. 14 is a top plan view of the pump chamber of the printing head constructed in accordance with the embodiment shown in FIG. 11.

DESCRIPTION OF THE PREFERRED EMBODIMENTS

Figure 1:
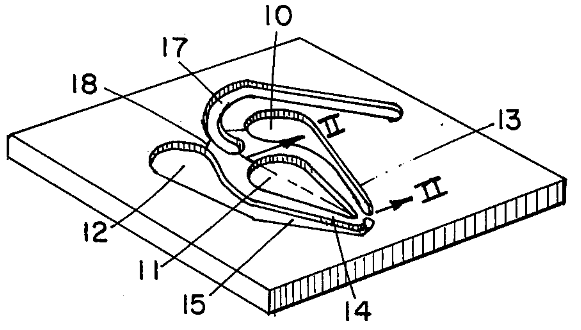
FIG. 1 is a perspective view of a finished plate of a printing head constructed in accordance with the teachings of the present invention.
Figure 2:
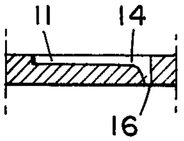
FIG. 2 is a partial sectional view taken along the lines II—II of FIG. 1.
Figure 3:
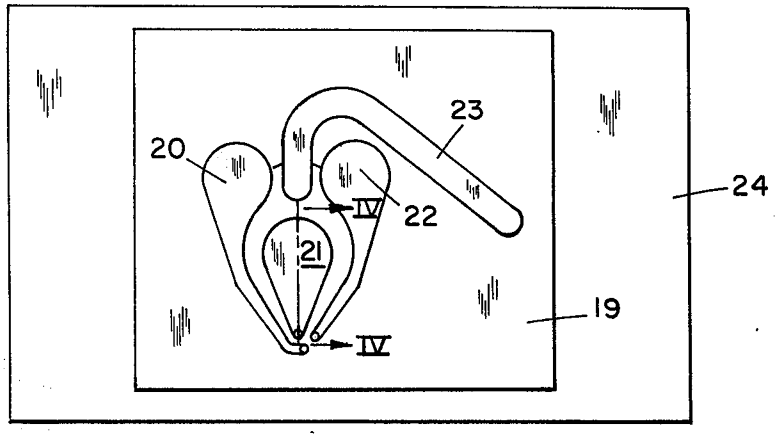
FIG. 3 is a top plan view of a mold used to perform the method of the invention.
Figure 4:
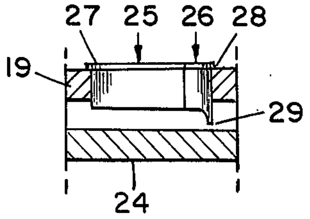
FIG. 4 is a partial sectional view taken along the lines IV—IV of FIG. 3.

FIG. 1 shows the plate P which is formed in the mold shown in FIG. 3 by means of injection molding. As seen in FIG. 3, the mold is provided with a plate 19 which has through holes 20, 21, 22 and 23 respectively of a configuration corresponding precisely with the cavities 10–15 and 17, respectively, as seen in FIG. 1. Furthermore, under the plate 19 is a base plate 24. This arrangement is seen particularly in FIG. 4 in which the distance between the plates 19 and 24 corresponds to the thickness of the entire unit to be manufactured. Cores are inserted in the holes 20–23 and, as seen in FIG. 4, the hole 21 is provided with two cores, 25 and 26, in which the larger core 25 forms the chamber 11 and the channel 14 while the smaller core 26 forms the capillary tube 16 and its passage into the channel 14. The cores are provided with projections 27 and 28, as seen in FIG. 4, which maintain the cores in a precise position vertically and which function to prevent the cores from falling out and on to the base plate 24. It should be noted particularly that it is of extreme importance that the vertical position of the core 26 for the capillary tube be accurately controlled because the extremely thin tip 29 of the core can be damaged if it engages the plate 24. In order to prevent the possibility of the aforesaid damage, a distance of between 2–10 mm. is maintained between the tip 29 and the base plate 24.

Figure 5:
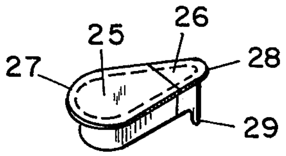
FIG. 5 is a perspective view of a core for a channel together with a corresponding core for a capillary tube.
Figure 6:
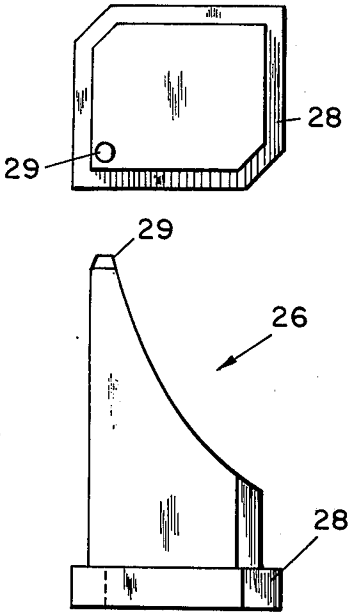
FIG. 6 is a side elevational and a top plan view of a core for a capillary tube.

Referring to FIG. 5, the cores 25 and 26 are shown juxtaposed to each other while FIG. 6 illustrates one form of a design of a core for the capillary tube.

Referring to FIG. 5, it will be observed that by dividing the core into two parts 25 and 26 an additional advantage is obtained in that even if the fine tip 29 is broken a major portion of the core is separate and re-usable. Two cores are inserted in each hole 20–22. However, in the hole 23, only one core, which corresponds to the core 25, is inserted therein, since the channel 17 does not have a capillary tube.

When all the cores utilized for the molding process are in position, the casting material is injected in the molds under pressure. After the material has hardened, the completed unit as shown in FIG. 1, is removed from the mold in a suitable manner after which the thin capillary tubes 18 are formed by milling or by some other suitable process.

Although the manufacture of a printing head showing only three capillary tubes has been described, it is within the scope of the present invention to have additional capillary tubes. In practice, these units generally have seven or nine tubes, however, in principle, the mode of operation is the same as the structure as described with three tubes.

Figure 7:
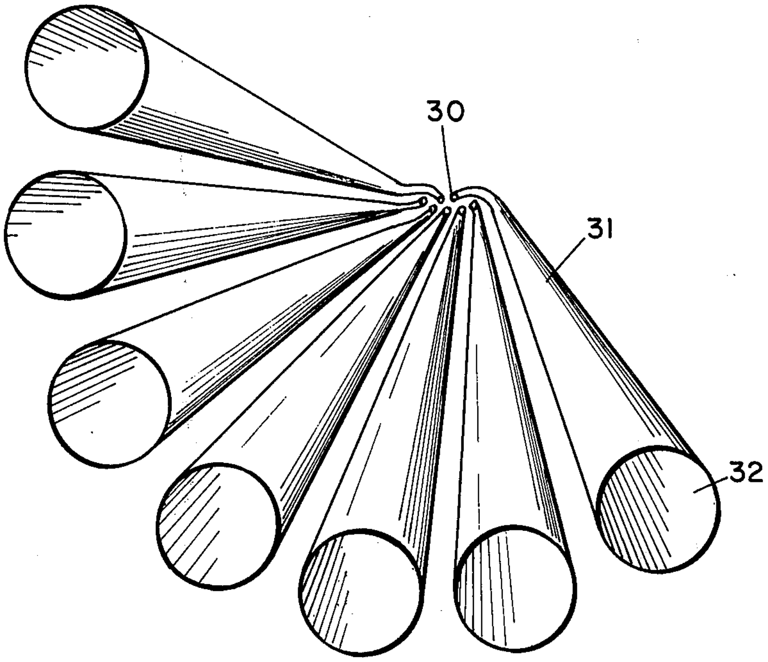
FIG. 7 is a perspective view of a selected configuration having seven channels with associated capillary tubes.

As seen in FIG. 7, seven capillary tubes are used and a channel 30 is illustrated as associated with a respective capillary tube, the continuation of which bears the reference numeral 31. Additionally, the pressure chamber is referred to by the reference numeral 32.

Figure 8:
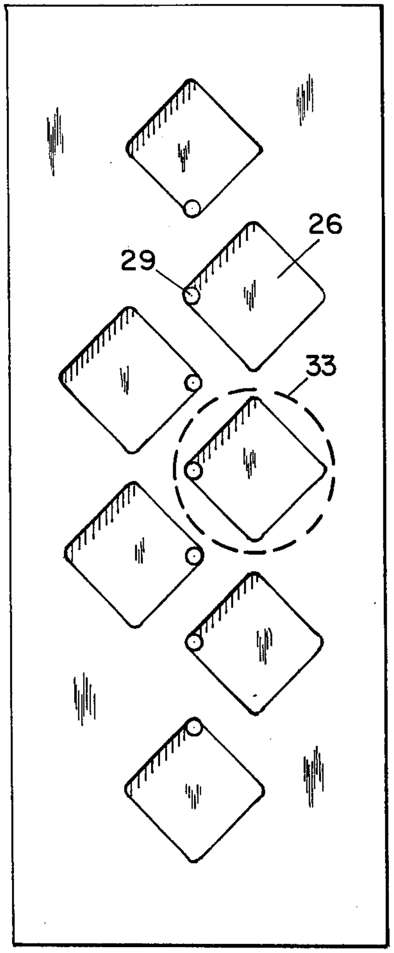
FIG. 8 is a diagrammatic view on an enlarged scale part of the head located adjacent to the capillary tubes.

As pointed out hereinbefore, ink jet printers of this type must have the openings of the capillary tubes very close together in order to achieve a good resolution on the print medium. However, at the same time, it should be noted that there is sufficient material remaining between the tubes in their widest portions. If, as seen in FIG. 8, the tips of the capillary tubes are aligned in which the small circles represent the openings, it is quite evident that the capillary tubes cannot be so close to one another as shown in FIG. 8, if the thickest portion of the cores are circular, as shown in dotted lines by the reference numeral 33. Therefore, the construction in which the cores are square in cross-section is most desirable, and as further shown in FIG. 8, sufficient material of each of the cores is left adjacent to the capillary tubes and, if desired, the corners of each of the cores may be rounded.

Figure 9:
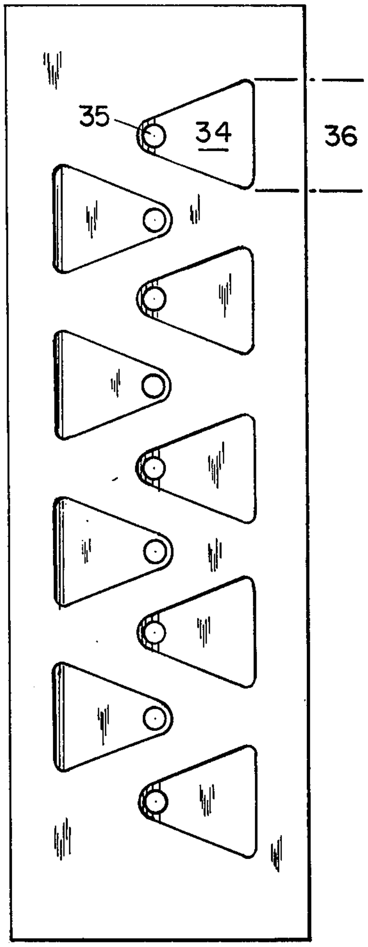
FIG. 9 is a diagrammatic view on an enlarged scale of another embodiment of the channels shown in FIG. 8 and connected to the respective capillary tubes.

Referring now to FIG. 9 in which even more material between the openings of the capillary tubes is shown which can be obtained by means of the configuration of the cores 34 as shown in FIG. 9. The cores 34 are of triangular cross-section in which each respective tip 35 is disposed at the apex of each triangle. The connection of the channel of each capillary tube will be relatively simple because the channel can be lead to the short side of the triangular capillary tube indicated by the reference numeral 36.

It is desired to point out that the manufacture of printing heads according to the present invention is simplified and results in printing head units which are very precise, and the present construction incorporates an advantage in that the tapering form of the capillary tubes eliminates the discontinuities which almost always occur as a result of drilled tubes.

As seen in FIGS. **10*a* and 10*b*, a liquid drop is shown ejected from the capillary tube resulting in a certain retraction of liquid from the opening. This is illustrated at 37 in FIG. 10*a* and at 38 in FIG. 10*b*. It will be observed that the liquid is retracted more in a capillary tube of uniform width, that is a tube in which the cross-section is constant, than a tube having a tapering cross-section, and in which the cross-sectional area increases inwardly of the tube. In fact, in a drilled capillary tube fabricated according to the structure shown in FIG. 10*a*, the liquid retraction can be so strong that there is a possibility that air will penetrate to the discontinuity in the passage into the channel of the capillary tube. Consequently, an air bubble formed in this channel as shown at 39 in FIG. 10*a* makes it virtually impossible to remove thereby destroying the effectiveness of the printing head unit. On the other hand, this problem does not arise in connection with a printing head constructed in accordance with the present invention, and such a construction is set forth in FIGS. 11–14 in which a capillary plate is shown having a capillary part 40 having in total nine capillary tubes 41, each with an opening 42. As seen in FIG. 11, each tube 41 widens from its opening toward the corresponding channel 43, which is located in either of the main surfaces 44, 45 of the part 40 (FIG. 13). As best seen in FIG. 12, the channels are alternately disposed in the upper and lower main surfaces 44 and 45,** respectively. Thus, the important advantage of present construction is that the capillary tubes can be placed closer together than would be possible if all the channels were disposed in the same main surface of the printing head.

As seen in FIG. 14, the plate 40 is connected to a pump chamber part 46, which also is in the form of a plate. A main surface of the plate 46 is shown in a plan view in FIG. 14. Five pump chambers 47 are illustrated in the main surface of the part 46. The remaining four chambers appear in the other main surface (not shown). Each pump chamber 47 is provided with a diaphragm which is acted upon by a piezoelectric crystal in a known manner. Furthermore, each chamber has a channel 48 which leads to a recessed portion 49 in which the capillary part 40 is to be fitted in such a manner that its main surfaces will be positioned in planes that are parallel to the main surfaces of said pump chamber part 46. Moreover, the channels 43 and 48 in the parts 40 and 46 respectively are so located that each channel 48 in the pump chamber part will be connected to a channel 43 in the capillary part when the latter is mounted on the pump chamber part. Inasmuch as the channels of the capillary part 40 opens into two main surfaces of this part, the pump chamber part can thus be formed in such a way that the channels continuing into this part, as well as the pump chambers 47 associated therewith, are distributed over both main surfaces of the pump chamber part.

It should be apparent that it is possible to reduce the size of the pump chamber part considerably, compared with the pump chambers located in the same main surface.

Since the channels 43 and 48 are formed by grooves in the surfaces of the respective plates, a covering plate will be required in order to cover the grooves so that closed channels are formed. If desired, it is also possible to make use of a diaphragm common for all pump chambers located at one side of the pump chamber part 46. The diaphragm will then lie between the part 46 and the corresponding cover plate.

What is claimed is:

1. Printing head for an ink jet printer comprising a first plate having spaced channels in one surface of said first plate, a separate plate having a pumping chamber for each of said channels and means for pumping fluid in each of said chambers, a plurality of capillary tubes each opening into another surface of said first plate, means connecting one end of each of said channels to a respective one capillary tube, one end of each of said capillary tubes forming an orifice for exiting the drops of printing fluid, each of said capillary tubes tapering in the direction from said channels to the opening of said tube and lying substantially in a straight line relative to a respective channel, and each of said capillary tubes opening into a surface of said first plate which is substantially perpendicular to the large surfaces of said first plate.

2. Printing head for an ink jet printer as claimed in claim 1, wherein each of said connecting means comprises a tapering part extending toward the capillary tube and forms a uniform transition into the latter.

3. Printing head for an ink jet printer as claimed in claim 1, wherein the angle of connection of each capillary tube to a corresponding channel is the same for all capillary tubes.

4. Printing head for an ink jet printer as claimed in claim 1 wherein said separate plate is provided with a recess and said first plate is inserted in said recess, said separate plate being provided with a plurality of channels corresponding to said spaced channels of the first plate which operatively connect each respective channel of said first plate to a corresponding pumping chamber.

5. Printing head for an ink jet printer as claimed in claim 1, wherein said channels are located in the opposite large surfaces of said plate, and said means connecting said capillary tubes to said channels wherein there are alternate connections from said capillary tubes to a channel on one large surface of said plate and to the other large surface of said plate.

* * * * *

UNITED STATES PATENT OFFICE
CERTIFICATE OF CORRECTION

Patent No. 4,005,440 Dated January 25, 1977

Inventor(s) Jan Roger Amberntsson et al.

It is certified that error appears in the above-identified patent and that said Letters Patent are hereby corrected as shown below:

IN THE HEADING

[75] Inventors: change "Rober" to --Roger--

[30] Foreign Application Priority Data

Change "7412233" to --7412332--

Signed and Sealed this

Tenth Day of May 1977

[SEAL]

*Attest:*

RUTH C. MASON
*Attesting Officer*

C. MARSHALL DANN
*Commissioner of Patents and Trademarks*